United States Patent
Cordray et al.

(10) Patent No.: US 6,920,483 B1
(45) Date of Patent: Jul. 19, 2005

(54) NOTIFICATION OF AUTOMATICALLY FORWARDED ELECTRONIC MAIL MESSAGES IN A DATA PROCESSING SYSTEM

(75) Inventors: David A. Cordray, Austin, TX (US); Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 09/653,245

(22) Filed: Aug. 31, 2000

(51) Int. Cl.⁷ .............................................. G06F 15/16
(52) U.S. Cl. ...................................... 709/206; 709/207
(58) Field of Search ................................ 709/203, 206, 709/207, 238, 225, 379, 93.01, 218; 379/93.24; 370/54

(56) References Cited

U.S. PATENT DOCUMENTS

| | | | |
|---|---|---|---|
| 5,493,564 A | 2/1996 | Mullan | 370/54 |
| 5,632,011 A | 5/1997 | Landfield et al. | 395/326 |
| 5,703,783 A * | 12/1997 | Allen et al. | 700/213 |
| 5,742,769 A | 4/1998 | Lee et al. | 395/200.36 |
| 5,822,526 A | 10/1998 | Waskiewicz | 395/200.36 |
| 5,844,969 A | 12/1998 | Goldman et al. | 379/93.24 |
| 5,898,836 A | 4/1999 | Freivald et al. | 395/200.48 |
| 5,937,161 A * | 8/1999 | Mulligan et al. | 709/206 |
| 6,012,087 A | 1/2000 | Freivald et al. | 709/218 |
| 6,088,720 A * | 7/2000 | Berkowitz et al. | 709/206 |
| 6,138,146 A * | 10/2000 | Moon et al. | 709/206 |
| 6,185,603 B1 * | 2/2001 | Henderson et al. | 709/206 |
| 6,389,455 B1 * | 5/2002 | Fuisz | 709/206 |
| 6,405,243 B1 * | 6/2002 | Nielsen | 709/206 |
| 6,437,806 B1 * | 8/2002 | Iwasa | 345/764 |

FOREIGN PATENT DOCUMENTS

| | | | |
|---|---|---|---|
| WO | WO 99/04344 | 1/1999 | G06F/13/00 |

* cited by examiner

*Primary Examiner*—Glenton B. Burgess
*Assistant Examiner*—Kimberly Flynn
(74) *Attorney, Agent, or Firm*—Duke W. Yee; Marilyn Smith Dawkins; Steven T. McDonald

(57) ABSTRACT

A method, system, and program in a data processing system for processing an electronic mail message. The electronic mail message is identified for a recipient. It is determined whether the electronic mail message for the recipient is to be forwarded to another address associated with the recipient. An indicator is included to identify the electronic mail message as being forwarded if the electronic mail message is to be forwarded to another address associated with the recipient.

23 Claims, 4 Drawing Sheets

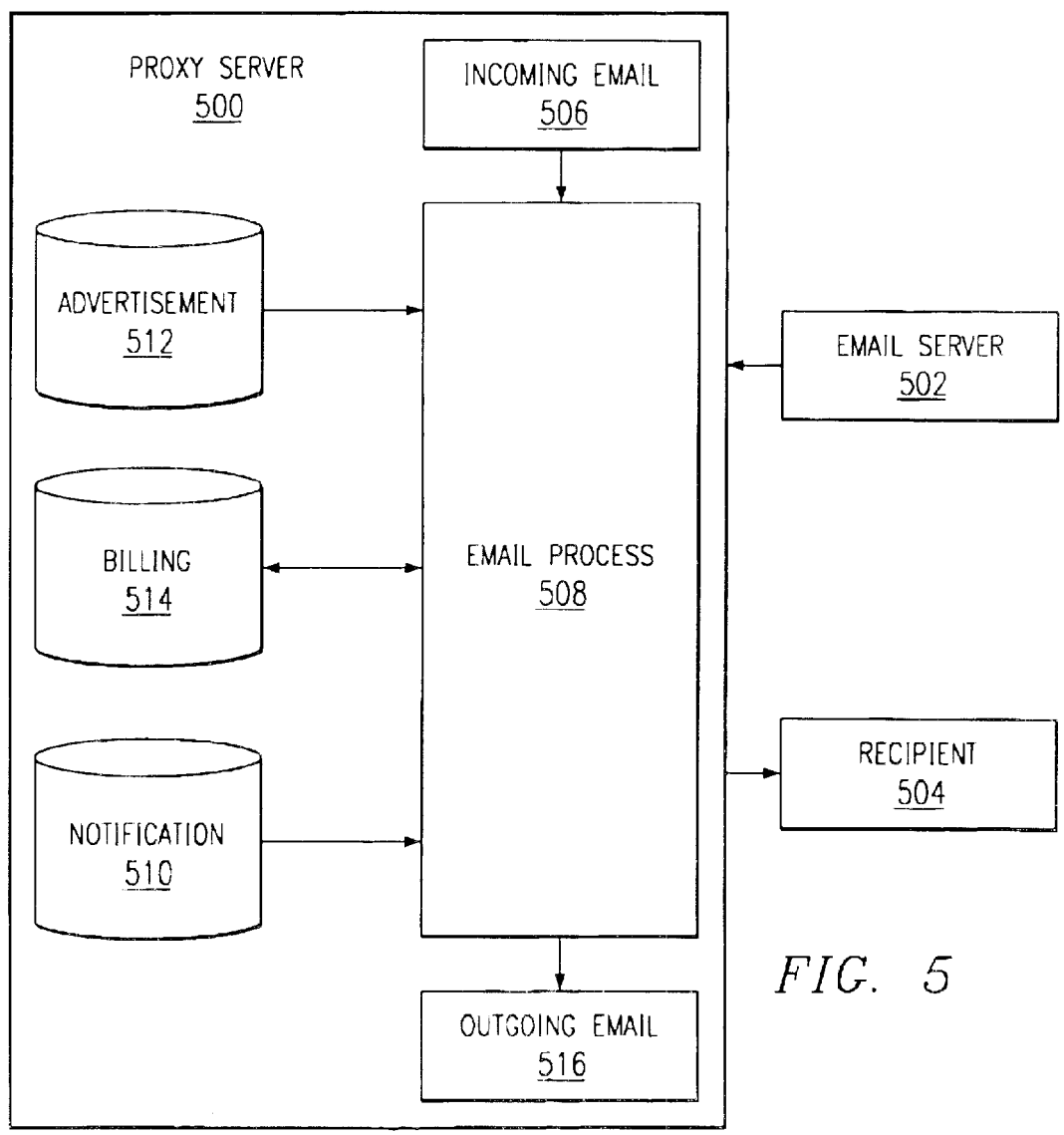

NOTIFICATION OF AUTOMATICALLY FORWARDED ELECTRONIC MAIL MESSAGES IN A DATA PROCESSING SYSTEM

BACKGROUND OF THE INVENTION

1. Technical Field

The present invention relates generally to an improved data processing system, and in particular to a method and apparatus for processing electronic mail messages. Still more particularly, the present invention relates generally to a method and apparatus for processing automatically forwarded electronic mail messages.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

The Internet also provides a medium for sending electronic mail messages between different users or recipients. These electronic mail messages are also referred to as email. With email, a user may send a message to one or more recipients almost instantaneously. Some users may have more than one email address. Additionally, email addresses are constantly changing for different reasons. Sometimes, a user may change service providers and receive a new email address. Other times, a service provider may be bought by or merged with another service provider. Sometimes when a service provider is bought or merged with another service provider, the combined entity will force or require some users to change domain names to have a consistent domain name in the email addresses.

When such a situation occurs, a user changing email addresses is required to notify everyone of the email address change. In many cases, when a change in domain name is required by a service provider, a grace period may be present in which both email addresses are accepted. When a user changes service providers, the user typically will maintain the old email address for a period of time and have the email sent to the old address forwarded to the new address.

It is important for a user to recognize that email is being forwarded from the original address to the new address in order to notify the sender of the email of the address change. Currently, this forwarding must be detected by looking at the "to: " field in the message to determine whether the address is the old address. In some cases, the message may be sent to many recipients in which all of these recipients are listed in the "to:" field. Such a procedure can become tedious when many recipients are listed for the email. Further, even if the user is meticulous in checking every email received to see whether it was forwarded from an old address, the address may not appear at all. For example, some email may be sent via distribution lists using a remailer program. In this case, the sender sends a note addressed to the distribution list on the server and the program distributes the email to all addresses currently found on the list. The "to: " field in the note may show for example, "distlistmail@abcd.org" rather than all of the addresses in the list. The actual address in this case is located in the routing information, but this information is typically removed by many email programs.

Therefore, it would be advantageous to have an improved method and apparatus for processing forwarded email messages to allow a user to identify messages forwarded from an old email address.

SUMMARY OF THE INVENTION

The present invention provides a method, system, and program in a data processing system for processing an electronic mail message. The electronic mail message is identified for a recipient. It is determined whether the electronic mail message for the recipient is being forwarded from another address associated with the recipient. An indicator is included to identify the electronic mail message as being forwarded if the electronic mail message being forwarded is from another address associated with the recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating an indicator for use in an email message in accordance with a preferred embodiment of the present invention;

FIG. 5 is a diagram illustrating components and data flow used in indicating forwarding of email messages in accordance with a preferred embodiment of the present invention.

DETAILED DESCRIPTION OF THE PREFERRED EMBODIMENT

Figure 1:
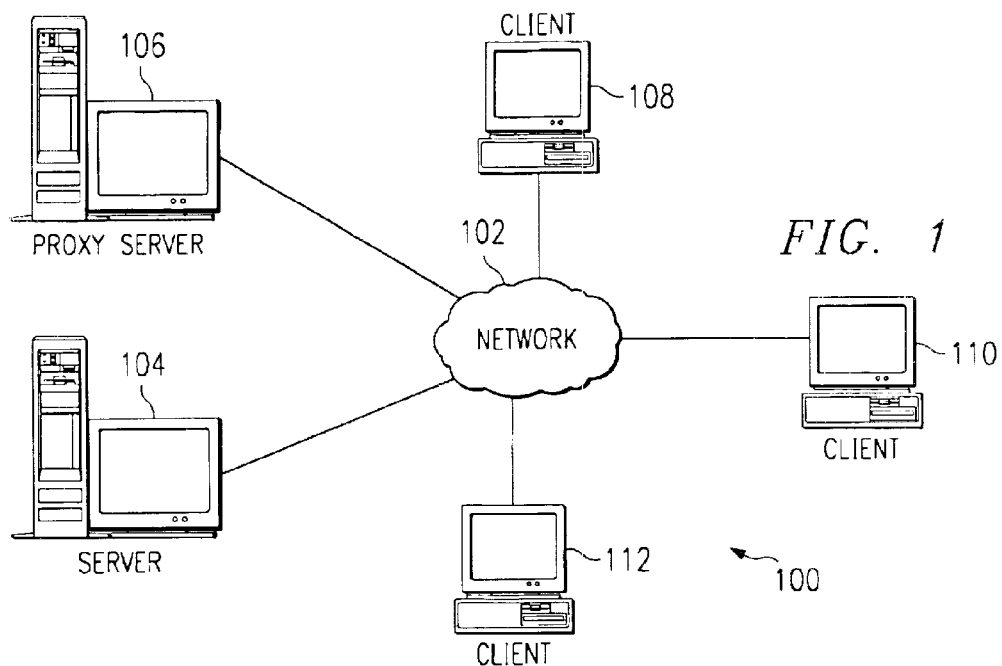
FIG. 1 depicts a pictorial representation of a distributed data processing system in which the present invention may be implemented.

With reference now to the figures, FIG. 1 depicts a pictorial representation of a data processing system network in which the present invention may be implemented. Data processing system network 100 is a network of computers in which the present invention may be implemented. Data processing system network 100 contains a network 102, which is the medium used to provide communications links between various devices and computers connected together within data processing system network 100. Network 102 may include permanent connections, such as wire or fiber optic cables, or temporary connections made through telephone connections.

In the depicted example, a server 104 is connected to network 102 along with proxy server 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Server 104 also may serve to receive and distribute email messages to different clients. In the depicted examples, proxy server 106 also may serve to distribute email messages to different clients. In this example, proxy server 106 may receive messages from server 104 for distribution to different clients.

Clients 108, 110, and 112 are clients to server 104. Distributed data processing system 100 may include additional servers, clients, and other devices not shown. In the depicted example, data processing system network 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, data processing system network 100 also may be implemented as a number of different types of networks, such as for example, an intranet, a local area network (LAN), or a wide area network (WAN). FIG. 1 is intended as an example, and not as an architectural limitation for the present invention.

Figure 2:
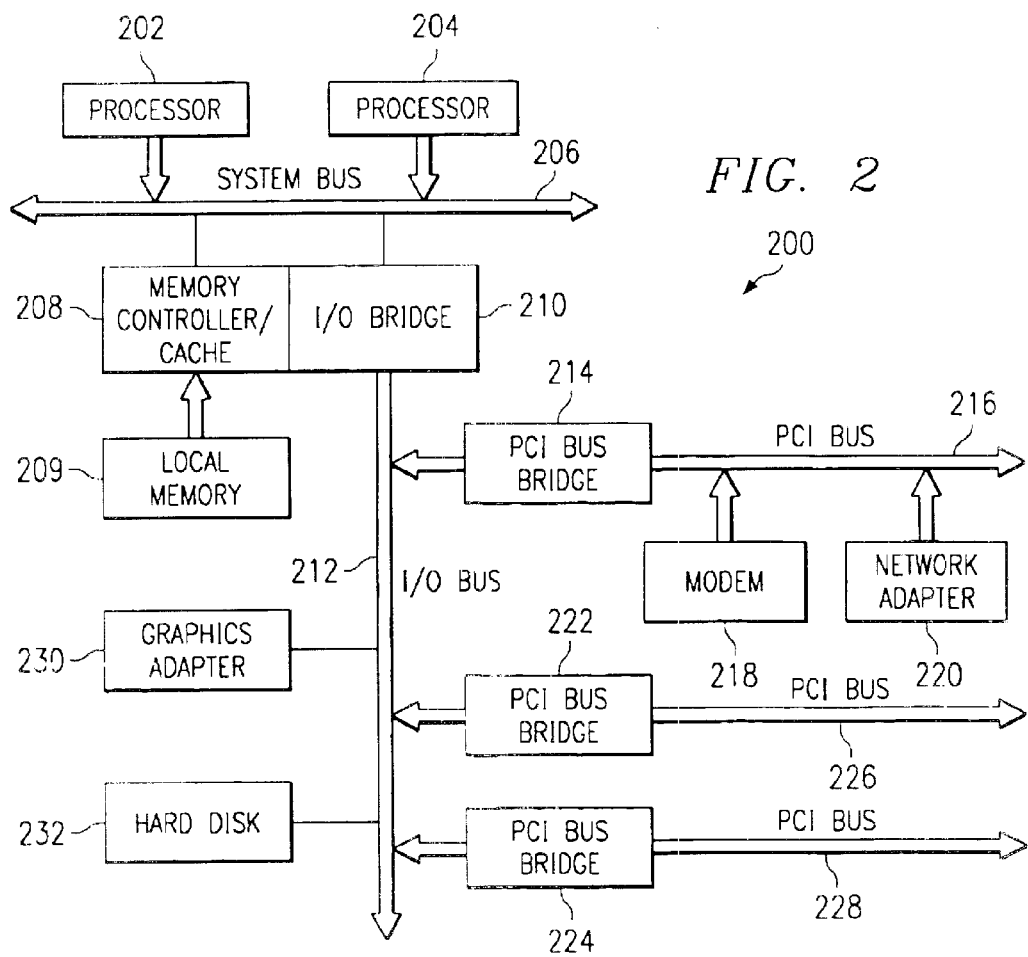
FIG. 2 is a block diagram of a data processing system that may be implemented as a server in accordance with a preferred embodiment of the present invention.

Referring to FIG. 2, a block diagram of a data processing system that may be implemented as a server, such as server 104 or proxy server 106 in FIG. 1, is depicted in accordance with a preferred embodiment of the present invention. In particular, server 200 contains the processes used to notify users or recipients of email messages that an email has been forwarded. The notification mechanism of the present invention includes an indicator or indication in the email message that the email message has been forwarded from another address associated with the user or recipient.

Server 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
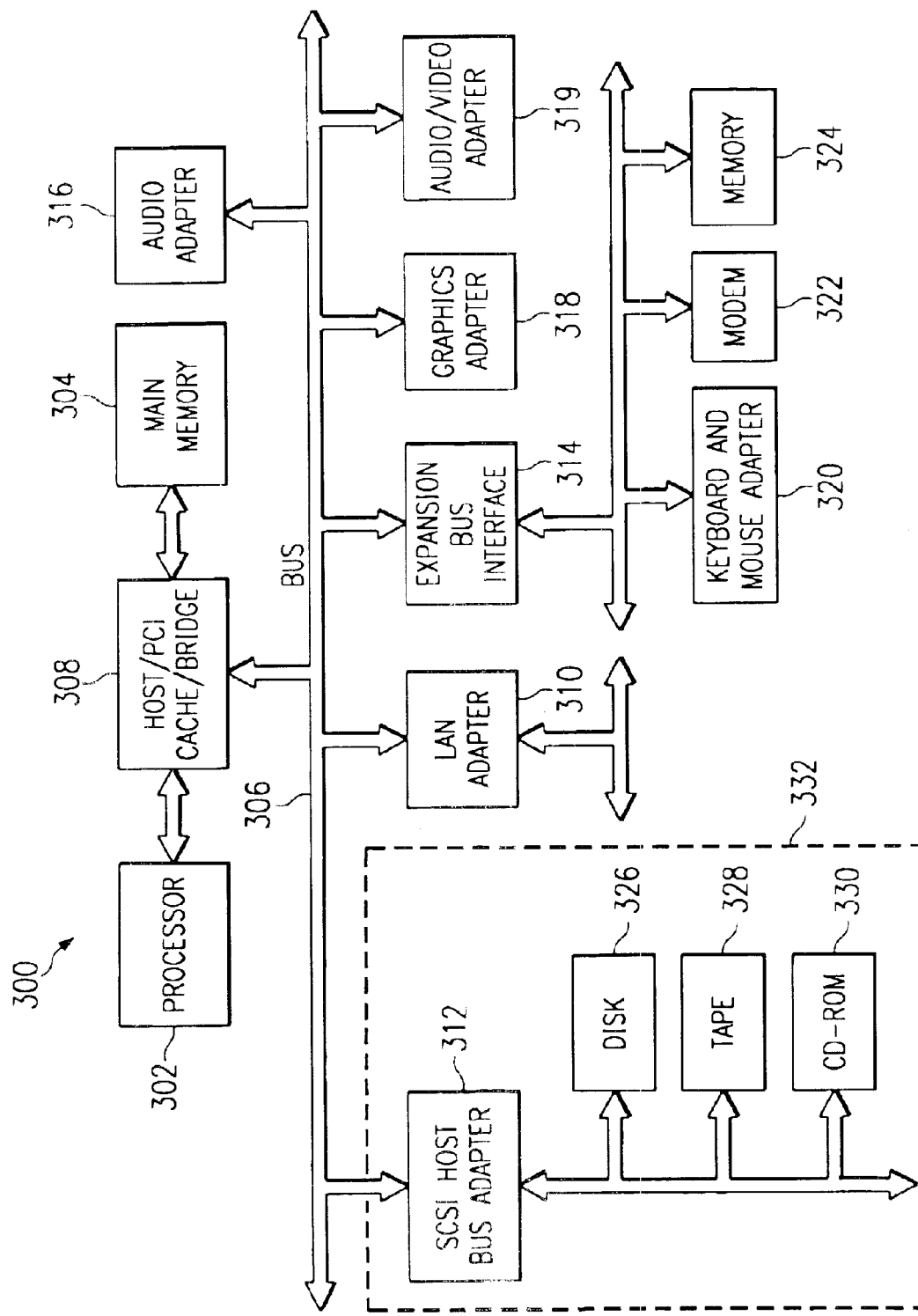
FIG. 3 is a block diagram illustrating a data processing system in which the present invention may be implemented.

With reference now to FIG. 3, a block diagram illustrating a data processing system in which the present invention may be implemented is depicted. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and program for indicating that an email message has been forwarded from an email address associated with a recipient. This associated address is typically an old email address that the recipient intends to no longer use after a period of time. The mechanism of the present invention identifies these type of email addresses and adds or includes an indicator with the email message. In the depicted example, the indicator takes the form of a block of text added to the body of the email message.

Turning next to FIG. 4, a diagram illustrating an indicator for use in an email message is depicted in accordance with a preferred embodiment of the present invention. In this example, indicator 400 is a visual indicator that is placed within an email message. Specifically, indicator 400 is placed in the body portion of the message. The body portion of an email message is that portion of the email message in which the actual content of the message is placed.

In this example, indicator 400 takes the form of text, identifying the message as being an email message forwarded from a particular address and reminding the recipient to notify the sender of the new address. Further, this text may be placed using different colors than the text of the rest of the message in the email message. Depending on the particular implementation, the indicator may take different forms other than that as illustrated by indicator 400. For example, a graphical indicator may be used instead of text. The indicator may be another window, such as a browser, which is automatically launched when the email is viewed. Audio indicators may be used in place of or in addition to the visual indicators. An audio indicator may be, for example, a ".wav" file that is played or presented when the email message is viewed.

Turning next to FIG. 5, a diagram illustrating components and data flow used in indicating forwarding of email messages is depicted in accordance with a preferred embodiment of the present invention. In this example, proxy server 500 receives email messages from an email server 502. These email messages are forwarded to different recipients, such as recipient 504. Of course, these processes also may be implemented in an email server, such as email server 502, rather than proxy server 500 used to forward email messages.

Email messages are received and placed into incoming email 506 to await processing. Incoming email 506 may be, for example, a buffer or queue used for holding email messages until they are processed. Email process 508 examines each email message within incoming email 506 to see whether the email is to be forwarded to another address for the recipient. If the email message is to be forwarded to another email address other than the original email address in the email message, a notification will be placed into the email message or associated with the email message from notification database 510. This notification may take the form of indicator 400 in FIG. 4. The notification may include, for example, the old email address that the sender used as well as an indication to notify the sender of the new email address. Of course, the indicator selected from notification database 510 may take other forms, such as using graphics or audio presentation.

Further, email process 508 also may place an advertisement into the email message from advertisement database 512. Also, a user may be billed for the notification service. In such a case, billing database 514 is updated by email process 508 each time a particular user receives a notification of a forwarded email message. Billing database 514 may include an identification of the recipient who is to receive notifications of forwarded email messages and tracking information to identify the number of times that notifications have been placed in an email message.

When the email message has been processed, the message is placed into outgoing email 516 for delivery to a recipient, such as recipient 504. Like incoming email 506, outgoing email 516 may be a buffer or queue for processed email messages in these examples.

Proxy server 500 provides a mechanism for forwarding email messages with indicators. Proxy server 500 further provides a mechanism in which advertisements or billing may occur for email messages being forwarded to a particular recipient. Additionally, existing mail servers are not required to make changes to support this forwarding mechanism in which indicators are added or associated with an email message.

Figure 6:
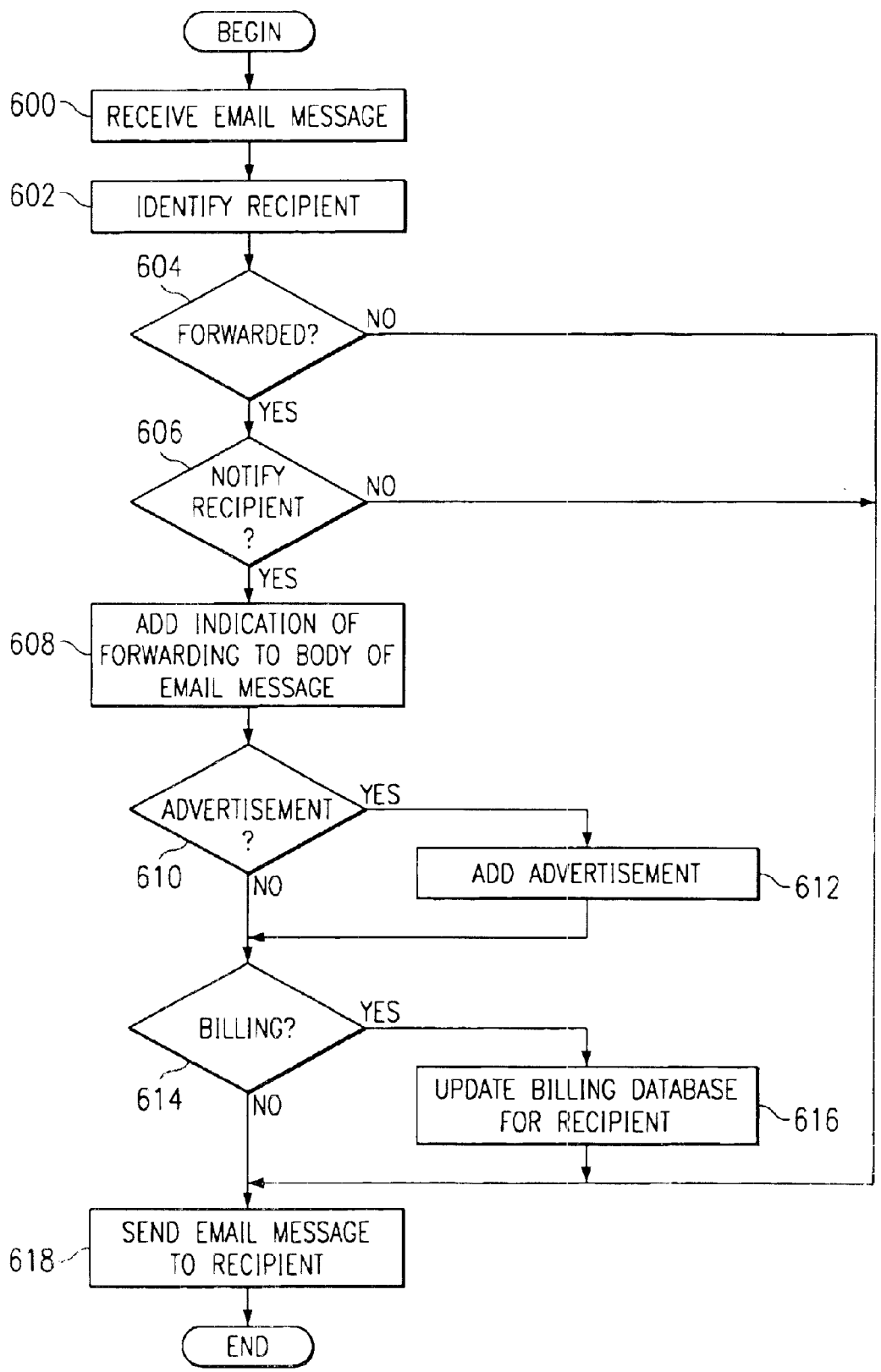
FIG. 6 is a flowchart of a process used for providing indicators for forwarded email messages in accordance with a preferred embodiment of the present invention.

Turning next to FIG. 6, a flowchart of a process used for providing indicators for forwarded email messages is depicted in accordance with a preferred embodiment of the present invention. In these examples, the process illustrated in FIG. 6 may be implemented within an email server such as server 104 or proxy server 106 in FIG. 1.

The process begins by receiving an email message (step 600). A recipient is then identified for the email message (step 602). Next, a determination is made as to whether the email message is a forwarded email message for another address for the recipient (step 604). If the message is to be forwarded, then a determination is made as to whether the recipient is to receive an indicator notifying the recipient that the email message is a forwarded email message (step 606).

If the recipient is to receive a notification, an indicator of the forwarding of the message is added to the body of the email message (step 608). In these examples, the indicator is added to the body of the email message, using an indicator, such as indicator 400 in FIG. 4. Of course, other types of indicators, such as those described above, may be added to the body of the text or associated with the email message depending on the implementation.

Next, a determination is made as to whether an advertisement is to be added to the email message (step 610). Depending on the implementation, an advertisement may be placed in the message as a mechanism to generate revenues for the function from entities wanting to distribute advertisements. If an advertisement is to be added, the advertisement is added to the email message (step 612). Then, a determination is made as to whether the recipient or some other entity is to be billed for the addition of the indicator to the email message (step 614). It is also possible that the billing is simply a subscription service, not a per-mail-item charge. The process proceeds directly to this step from step 610 if an advertisement is not to be added to the message. The billing function provides another mechanism to generate revenues for providing the indicator service for forwarded email messages. If billing is to occur, a billing database for the recipient or other entity is then updated to reflect the processing of the email message (step 616). Thereafter, the email message is sent to the recipient (step 618) with the process terminating thereafter.

With reference again to step 614, if billing is not to occur, the process proceeds directly to step 618 as described above. Referring back to step 606, if the recipient is not to be notified, then the process proceeds to step 618. Turning back to step 604, if the email message is not one that is being forwarded from another email address associated with the recipient, then the process proceeds directly to step 618.

The process described in FIG. 6 will add the notification information to the message and remail the message to the forwarding address if the process is implemented as part of an email server. Alternatively, if implemented in a proxy server, the email server is configured to forward all incoming mail to the address for the proxy server. The proxy server will add the notification prior to forwarding the message to the recipient. Thus, when implemented with a proxy server, two "hops" are required to send the message to the recipient.

The mechanism of the present invention is particularly useful when an email address for a recipient is to change. For example, a user has an email address JerryMalcolm@ibm.net that is going away as a result of a merger or change in ownership. The host has an email mailbox server that hosts a mailbox called JerryMalcolm. The owner of that mailbox is able to have the mail server hold mail for collection by the user's mail program, such as that provided in Netscape Navigator. Alternatively, the user may have messages forwarded to a new email address, such as Jerry@Malcolms.com. If the host mailbox server has implemented the mechanism of the present invention, the user may have the email server append the forwarding notification information to the body of the note as it does the forwarding. If the host email server does not implement the mechanism of the present invention, but "abc123.com" has a server that does and is in the business or providing notifications, the user may contract with abc123.com to provide the user a mailbox on their server for a period of time. The user would have the host email server forward the user's messages to JerryMalcolm@abc123.com. Subsequently, the user would have the server for abc123.com forward incoming messages to Jerry@Malcolms.com and also append the forwarding notification. In turn, abc123.com may either charge the user for the service, such as in the form of a subscription or a per-item charge. Alternatively, abc123.com may obtain revenues for the service by selling advertisement space in the notifications and append advertisements along with the notifications.

Thus, the present invention provides an improved method, apparatus, and program for a forwarding service or mechanism for forwarding information to an email message. An indicator is added to an email message that is forwarded from another email address associated with the recipient. This indicator is used to provide notification to the recipient that the email message was sent to another email address and forwarded to the recipient. The indicator is also used to allow the recipient to notify the sender of the new email address. In the depicted examples, this function is implemented in a proxy server, which receives email messages from email servers. This proxy server identifies whether an email message is being forwarded to another email address for the user and adds the appropriate indicator. Additionally, the addition of advertisements and/or billing may be performed in the proxy server. The use of the proxy server allows the addition of this forwarding service or function without requiring changes to the existing email servers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted examples illustrated placing the indicator in the body of the electronic message, the indicator may be placed anywhere within the electronic message, such as in the subject field. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing an electronic mail message, the method comprising:
   determining whether the electronic mail message is to an old address for a recipient that is to be forwarded to another address associated with the recipient, wherein the old address is no longer a current address for the recipient;
   including an indicator identifying the electronic mail message as being forwarded from the old address if the electronic mail message is to be forwarded to the another address associated with the recipient, wherein the indicator indicates that the old address is no longer current for the recipient; and
   sending the electronic mail message with the indicator to the another address if the electronic mail message is to be forwarded to the another address associated with the recipient.

2. The method of claim 1 further comprising sending the electronic mail message to the recipient after including the indicator.

3. The method of claim 1, wherein the indicator is text in a body of the electronic mail message.

4. The method of claim 1, wherein the indicator identifies the electronic mail message as being forwarded from the another address.

5. The method of claim 1, wherein the indicator is an audio indicator.

6. The method of claim 1, wherein the indicator is a presentation of a wave file.

7. The method of claim 1, wherein the indicator is a graphical indicator displayed in a body of the electronic mail message.

8. The method of claim 1 further comprising:
updating a billing database for including the indicator for the recipient.

9. The method of claim 1, wherein the indicator further includes an advertisement.

10. A method in a data processing system for forwarding an electronic mail message, the method comprising:
receiving a signal to forward the electronic mail message to another address for a recipient instead of an old address in the email message;
including an indication in the electronic mail message that the electronic mail message is forwarded from an old address for the recipient and that the old address is no longer current for the recipient in response to receiving the signal; and
sending the electronic mail message with the indicator to the another address.

11. A data processing system comprising:
a bus system;
a communications unit connected to the bus, wherein data is sent and received using the communications unit;
a memory connected to the bus system, wherein a set of instructions are located in the memory; and
a processor unit connected to the bus system, wherein the processor unit executes the set of instructions to determine whether the electronic mail message is to an old address for a recipient that is to be forwarded to another address associated with the recipient, wherein the old address is no longer a current address; include an indicator identifying the electronic mail message as being forwarded from the old address if the electronic mail message is to be forwarded to the another address associated with the recipient, wherein the indicator indicates that the old address is no longer current for the recipient; and send the electronic mail message with the indicator to the another address if the electronic mail message is to be forwarded to the another address associated with the recipient.

12. A data processing system for processing an electronic mail message, the data processing system comprising:
determining means for determining whether the electronic mail message is to an old address for a recipient that is to be forwarded to another address associated with the recipient, wherein the old address is no longer a current address for the recipient;
including means for including an indicator identifying the electronic mail message as being forwarded from the old address if the electronic mail message is to be forwarded to the another address associated with the recipient, wherein the indicator indicates that the old address is no longer current for the recipient; and
sending means for sending the electronic mail message with the indicator to the another address if the electronic mail message is to be forwarded to the another address associated with the recipient.

13. The data processing system of claim 12 further comprising:
sending means for sending the electronic mail message to the recipient after including the indicator.

14. The data processing system of claim 12, wherein the indicator is text in a body of the electronic mail message.

15. The data processing system of claim 12, wherein the indicator identifies the electronic mail message as being forwarded from the another address.

16. The data processing system of claim 12, wherein the indicator is an audio indicator.

17. The data processing system of claim 12, wherein the indicator is a presentation of a wave file.

18. The data processing system of claim 12, wherein the indicator is a graphical indicator displayed in a body of the electronic mail message.

19. The data processing system of claim 12 further comprising:
updating means for updating a billing database for including the indicator for the recipient.

20. The data processing system of claim 12, wherein the indicator further includes an advertisement.

21. A data processing system for forwarding an electronic mail message, the data processing system comprising:
receiving means for receiving a signal to forward the electronic mail message to another address for a recipient instead of an old address in the email message;
including means for including an indication in the electronic mail message that the electronic mail message is forwarded from an old address for the recipient and that the old address is no longer current for the recipient in response to receiving the signal; and
sending means for sending the electronic mail message with the indicator to the another address.

22. A computer program product in a computer readable medium for use in a data processing system for processing an electronic mail message, the computer program product comprising:
first instructions for determining whether the electronic mail message is to an old address for a recipient that is to be forwarded to another address associated with the recipient, wherein the old address is no longer a current address for the recipient;
second instructions for including an indicator identifying the electronic mail message as being forwarded from the old address if the electronic mail message is to be forwarded to the another address associated with the recipient, wherein the indicator indicates that the old address is no longer current for the recipient; and
third instructions for sending the electronic mail message with the indicator to the another address if the electronic mail message is to be forwarded to the another address associated with the recipient.

23. A computer program product in a computer readable medium for use in a data processing system for forwarding an electronic mail messages, the data processing system comprising:
first instructions for receiving a signal to forward the electronic mail message to another address for a recipient instead of an old address in the email message;
second instructions for including an indication in the electronic mail message that the electronic mail message is forwarded from an old address for the recipient and that the old address is no longer current for the recipient in response to receiving the signal; and
third instructions for sending the electronic mail message with the indicator to the another address.

* * * * *